United States Patent
Gano

(10) Patent No.: US 9,387,880 B2
(45) Date of Patent: Jul. 12, 2016

(54) MULTI-AXIS CASTER ANGLE CONTROL SYSTEM OF AN EXTENDABLE WHEEL ASSEMBLY

(76) Inventor: John Victor Gano, Russin (CH)

( * ) Notice: Subject to any disclaimer, the term of this patent is extended or adjusted under 35 U.S.C. 154(b) by 0 days.

(21) Appl. No.: 14/405,480

(22) PCT Filed: Jun. 4, 2012

(86) PCT No.: PCT/EP2012/060502
§ 371 (c)(1),
(2), (4) Date: Dec. 4, 2014

(87) PCT Pub. No.: WO2013/182222
PCT Pub. Date: Dec. 12, 2013

(65) Prior Publication Data
US 2015/0123367 A1 May 7, 2015

(51) Int. Cl.
*B62D 7/15* (2006.01)
*B60B 19/00* (2006.01)
(Continued)

(52) U.S. Cl.
CPC ............ *B62D 7/1509* (2013.01); *B60B 19/003* (2013.01); *B60G 3/02* (2013.01); *B60G 17/0163* (2013.01); *B60G 2200/44* (2013.01); *B60G 2200/46* (2013.01); *B60G 2200/464* (2013.01); *B60G 2204/127* (2013.01); *B60G 2204/128* (2013.01); *B60G 2204/4232* (2013.01); *B60G 2204/62* (2013.01); *B60G 2300/37* (2013.01); *B60G 2300/40* (2013.01);
(Continued)

(58) Field of Classification Search
CPC ...... B62D 7/1509; B60B 19/003; B60G 3/02; B60G 17/0163; B60G 2300/37; B60G 2300/40; B60G 2204/127; B60G 2204/62; B60G 2204/128; B60G 2204/4232; B60G 2200/44; B60G 2200/464; B60G 2200/46; B60G 2400/204; B60G 2800/24; B60G 2800/962; B60G 2500/30
See application file for complete search history.

(56) References Cited

U.S. PATENT DOCUMENTS

| 2,533,752 | A | 12/1950 | Alamagny |
| 3,404,746 | A | 10/1968 | Slay |
| 4,084,837 | A * | 4/1978 | Milner ................... 280/124.147 |

(Continued)

FOREIGN PATENT DOCUMENTS

| CN | 2078249 U | 6/1991 |
| CN | 1184744 | 6/1998 |

(Continued)

OTHER PUBLICATIONS

PCT/EP2011/056380 International Search Report dated Jul. 7, 2011 (3 pages).
(Continued)

*Primary Examiner* — Laura Freedman
(74) *Attorney, Agent, or Firm* — Brinks Gilson & Lione; G. Peter Nichols

(57) ABSTRACT

A wheel assembly for vehicle includes a wheel, at least one lower suspension link and one upper part, the wheel being arranged to rotate at 360°, to steer the vehicle around a pivot line, a projection of the pivot line onto a vertical projection plane including a vertical axis passing through a contact point between the wheel and ground defining a caster angle ($\alpha$) with the vertical axis. The wheel assembly includes a at least one screw arranged to adjust the caster angle ($\alpha$) such that the position of the upper part is moveable relative to the vehicle along a first degree of freedom and a second degree of freedom.

9 Claims, 3 Drawing Sheets

(51) Int. Cl.
*B60G 3/02* (2006.01)
*B60G 17/016* (2006.01)

(52) U.S. Cl.
CPC ...... *B60G 2400/204* (2013.01); *B60G 2500/30* (2013.01); *B60G 2800/24* (2013.01); *B60G 2800/962* (2013.01)

(56) References Cited

U.S. PATENT DOCUMENTS

| | | | |
|---|---|---|---|
| 4,213,631 A * | 7/1980 | Wilkerson | 280/86.752 |
| 4,581,802 A * | 4/1986 | Castoe | 29/402.19 |
| 5,072,960 A * | 12/1991 | Sperko | 280/47.34 |
| 5,080,388 A * | 1/1992 | Berry et al. | 280/86.757 |
| 5,094,472 A * | 3/1992 | Oyama et al. | 280/86.751 |
| 5,498,018 A | 3/1996 | Wahl et al. | |
| 5,700,025 A | 12/1997 | Lee | |
| 6,024,381 A | 2/2000 | Mottola | |
| 6,094,846 A | 8/2000 | Feller | |
| 6,170,838 B1 * | 1/2001 | Laurent et al. | 280/5.508 |
| 6,428,089 B1 | 8/2002 | Noda | |
| 6,485,038 B1 * | 11/2002 | Garrard | 280/86.75 |
| 6,485,223 B1 * | 11/2002 | Van Schmus et al. | 403/408.1 |
| 6,676,145 B2 * | 1/2004 | Carlstedt et al. | 280/124.146 |
| 6,688,620 B2 * | 2/2004 | Serra et al. | 280/124.135 |
| 6,796,569 B2 * | 9/2004 | Pankau | 280/124.155 |
| 7,168,717 B2 * | 1/2007 | Wubben et al. | 280/124.127 |
| 7,401,794 B2 | 7/2008 | Laurent et al. | |
| 7,464,785 B2 | 12/2008 | Spark | |
| 7,744,102 B2 | 6/2010 | Bailey et al. | |
| 7,823,673 B2 | 11/2010 | Asogawa | |
| 8,689,914 B2 | 4/2014 | Gano et al. | |
| 2002/0047293 A1 | 4/2002 | Noda | |
| 2002/0170764 A1 | 11/2002 | Oshima et al. | |
| 2003/0122336 A1 | 7/2003 | Zadok | |
| 2006/0017248 A1 | 1/2006 | Kang | |
| 2008/0065265 A1 | 3/2008 | Ozick et al. | |
| 2008/0125938 A1 | 5/2008 | Pierpont | |
| 2009/0288904 A1 | 11/2009 | Chang | |
| 2011/0024219 A1 * | 2/2011 | Jorgensen et al. | 180/252 |
| 2013/0020775 A1 | 1/2013 | Beji | |
| 2013/0056288 A1 | 3/2013 | Gano et al. | |
| 2013/0098695 A1 | 4/2013 | Itou et al. | |
| 2015/0028550 A1 * | 1/2015 | Gano | 280/5.51 |

FOREIGN PATENT DOCUMENTS

| | | |
|---|---|---|
| CN | 201161631 | 12/2008 |
| DE | 33 33 476 | 12/1984 |
| DE | 35 33 216 | 3/1987 |
| DE | 197 54 425 | 6/1999 |
| EP | 0 983 883 | 3/2000 |
| GB | 1 062 102 | 3/1967 |
| JP | S 60151181 | 8/1985 |
| JP | 3678344 | 5/2005 |
| KR | 2007 0014782 | 2/2007 |
| WO | WO 98/19875 | 5/1998 |
| WO | WO 99/54186 | 10/1999 |
| WO | WO 00/32462 | 6/2000 |
| WO | WO 02/22428 | 3/2002 |
| WO | WO 2005/030509 | 4/2005 |
| WO | WO 2010/150286 | 12/2010 |
| WO | WO 2011/147648 | 12/2011 |

OTHER PUBLICATIONS

PCT/EP2012/053805 International Search Report dated Aug. 1, 2012 (3 pages).
PCT/EP2012/060502 International Search Report dated Aug. 13, 2012 (3 pages).
U.S. Appl. No. 14/379,619, filed Aug. 19, 2014.

* cited by examiner

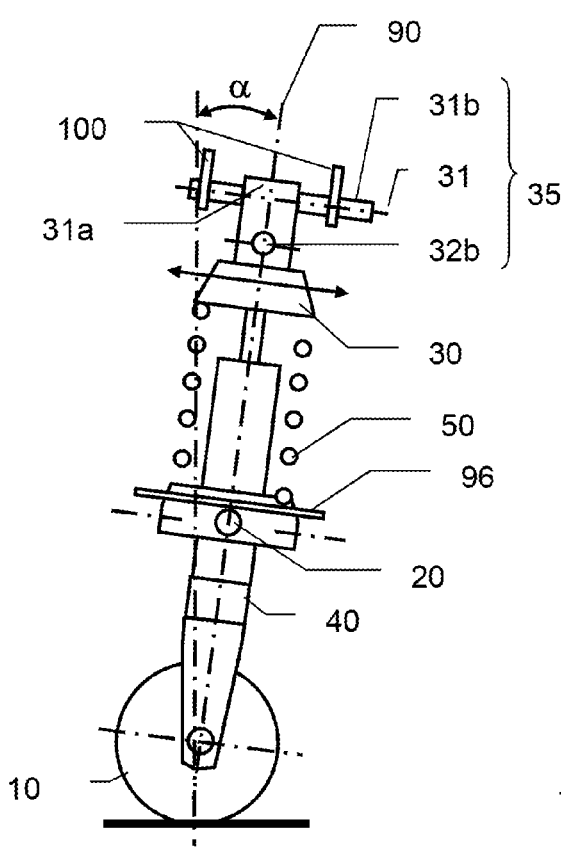
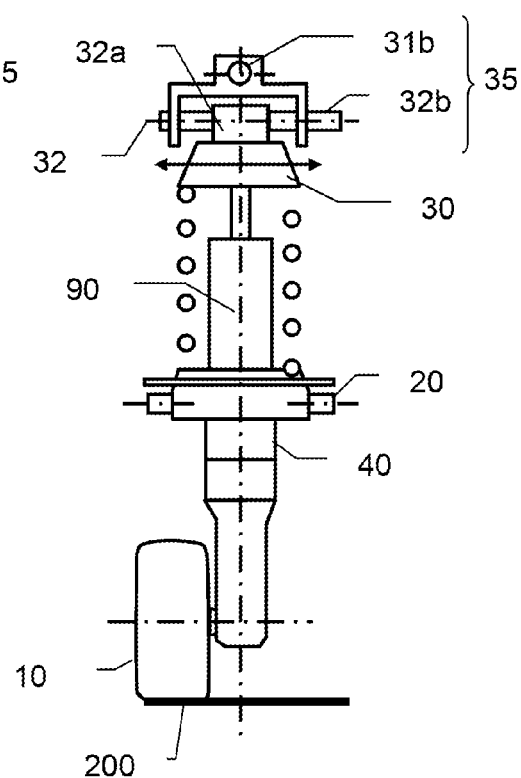

MULTI-AXIS CASTER ANGLE CONTROL SYSTEM OF AN EXTENDABLE WHEEL ASSEMBLY

This application claims priority to International Application No. PCT/EP2012/060502 filed Jun. 4, 2012; the entire content is incorporated herein by reference.

BACKGROUND

The present invention relates to a wheel assembly having an adjustable caster angle and a vehicle comprising at least two such wheel assemblies.

The document WO 2010/150286 describes a vehicle having five omni-directional wheel assemblies. Such a vehicle can adjust its height by moving the wheel support but this height adjustment is done at the axle level, so that the system is complicated and either the front or the rear end will move so that stability in curves is not improved. It should also be noticed that the increase of height will lead to a loss of stability due to raised center of gravity, and the safety of the occupants may be compromised.

The document WO 2011/147648 describes a vehicle having wheel assemblies with an adjustable caster angle. However, the system disclosed in this document is limited to adjust the caster angle within a limited range of values.

SUMMARY

The present invention aims to solve these aforementioned drawbacks and is directed to propose first an omni-directional wheel assembly able to provide improved adjustment of the caster angle, so that stability will be improved in cornering, on sloped surfaces and if the height of the vehicle is increased.

With this goal in mind, a first aspect of the invention is a wheel assembly for vehicle comprising:
  a wheel,
  at least one lower suspension link and one upper part, both being arranged to be attached to the vehicle,
the wheel being arranged to rotate at 360°, to steer the vehicle, around a pivot line positioned by said at least one lower suspension link and said upper part once attached to the vehicle,
a projection of the pivot line onto a vertical projection plane comprising a vertical axis passing through a contact point between the wheel and ground defining a caster angle with said vertical axis, the wheel assembly comprising:
  caster adjustment means arranged to adjust the caster angle within a predetermined range, whatever the orientation of the projection plane, characterized in that the position of the upper part is moveable relatively to the vehicle along a first degree of freedom and a second degree of freedom and in that said caster adjustment means are arranged to control the position of said upper part along the first degree of freedom and the second degree of freedom.

The wheel assembly according to the present invention offers an improvement to the systems of the prior art as the upper part has two degrees of freedom. The adjustment of the caster angle may be done by independently moving the upper part along the two degrees of freedom, so that the system offers more possibilities to adjust the caster angle. In other words, the pivot line may be positioned with two degrees of freedom, not only to adjust the caster angle, but also to increase the width of the track if necessary to keep safe conditions of driving.

Advantageously, the first degree of freedom and the second degree of freedom are two translations along two axes contained in a plane perpendicular to the pivot line. This embodiment offers the possibility to position the upper part with an X-Y system, at any point located within a square, a rectangle or any other kind of area defined by the two axes. Such X-Y adjustment system is flexible to position the upper part by moving it along one axis or the other, or the two axes simultaneously. Ideally, the two axes are perpendicular.

Advantageously, the caster adjustment means comprise a first and a second screw forming the two axes, the first screw being arranged to be attached to the vehicle and controlling a position along its axis of a first moveable nut, the second screw being attached to the first moveable nut and controlling a position along its axis of a second moveable nut, the upper part being attached to the second moveable nut. This embodiment with screw-nut assemblies is efficient and robust to set a desired position of the upper part along the axes.

Ideally, the caster adjustment means comprise two electrical motors, and the first and second screws are each linked to one of said electrical motors arranged to control the position of the first and second moveable nuts. The electrical motors of this embodiment allow a precise, swift, and dynamic positioning of the upper part to the required position.

As an alternative, the caster adjustment means comprise two pneumatic motors, and the first and second screws are each linked to one of said pneumatic motors arranged to control the position of the first and second moveable nuts. Pneumatic motors may be a cost effective solution in comparison to electric motors, if the vehicle is equipped with a compressed air dispensing device.

As an alternative to this first embodiment, the first degree of freedom is a rotation around an axis parallel to the pivot line, and the second degree of freedom is a translation parallel to the pivot line. This embodiment takes advantage of the construction arrangement with the ball joint located at the lower suspension link: the translation parallel to the pivot line varies the arm lever, so that the caster angle is modified.

Advantageously, the caster adjustment means comprise an eccentric case:
  linked to the vehicle,
  arranged to rotate around said axis parallel to the pivot line,
  having, at an eccentric distance from said axis parallel to the pivot line, an attachment to the upper part, and
  arranged to slide relatively to the attachment to the upper part in a translation direction parallel to the pivot line.

Advantageously, the caster adjustment means comprise a lever arranged to form the attachment between the eccentric case and the upper part, the lever having a fulcrum arranged to be attached to the vehicle, and the fulcrum being arranged between the eccentric case and the upper part. The additional lever according to this embodiment of the present invention amplifies the displacement of the upper part, as the fulcrum is arranged between the eccentric case and the upper part. This embodiment reduces the necessary translation of the eccentric case parallel to the pivot line to get a significant displacement of the upper part, resulting in a significant adjustment of the caster angle.

Advantageously, the wheel assembly is arranged to adjust the caster angle in relation to driving conditions. The caster angle is adjusted to enhance the stability, in relation to the driving conditions depending on turn angle, speed, road grip, etc. In other words, the caster angle is adjusted to specific values if the vehicle is changing direction, to other specific values if the vehicle has to perform an emergency deceleration, etc.

Advantageously, the wheel assembly comprises length adjustment means arranged to adjust a distance between the upper attachment point and the contact point between the wheel and ground, in relation to the adjusted caster angle. The length adjustment means according to the present embodiment allow a modification of the height of the vehicle body, in relation to driving conditions. In other words, if the vehicle is driving onto asphalt, the height may be set at a minimum value, but if there is water onto the road (flood conditions) or if there are objects to overpass, the height of the vehicle may be increased (up to 1 meter or more for example). Extension adjustments to outer and inner drive assemblies in curves and cornering may compensate centrifugal force on passengers with a "banking effect". This way of independently adjusting the height, at the wheel assembly level avoids the need to articulate the cabin to achieve this banking effect, and the vehicle structure is simpler and more cost effective to tilt the chassis.

Advantageously, the length adjustment means are arranged to adjust the distance in relation to the rotation of the wheel around the pivot line. The stability of the vehicle is increased when the vehicle is changing of direction. The control commands are operated by an integrated active control system governing the wheel assemblies, at the vehicle level, to compute all the relevant data relative to the driving conditions (speed, turn angle, emergency breaking, and slope of the road), before sending commands to adjust the caster angle and length of each wheel assembly.

Another aspect of the invention is that the wheel assembly comprises:
- an articulation between the wheel axis and the pivot line, and
- camber angle adjustment means arranged to allow an adjustment of the camber angle between the wheel axis and a horizontal axis, to compensate an effect of an adjustment of the position of the upper part along any of its degrees of freedom. This embodiment provides a compensation of an inclination of the pivot line that would affect the camber angle. The stress on the tires is not increased, as the camber angle is corrected if the pivot line is inclined, even if the pivot line is inclined to move the wheel out of the vehicle's chassis periphery. In other words, if the vehicle's height is increased so that the stability is compromised, the pivot line is inclined to increase the track, resulting in a movement of the wheels apart from each other. In extreme situations, the wheels may move away from each other by fifty centimeters or more, and the camber angle would be strongly modified. With the camber adjustment means and the articulation between the wheel axis and pivot line, the camber angle is adjusted to be kept within a predetermined ranged, whatever the inclination of the pivot line and the caster angle.

The invention is also related to a vehicle comprising at least one wheel assembly according to the first aspect of the invention, and wherein the caster angle is adjusted in relation to driving conditions.

BRIEF DESCRIPTION OF THE DRAWINGS

Other characteristics and advantages of the present invention will appear more clearly from the following detailed description of particular non-limitative examples of the invention, illustrated by the appended drawings where:

FIG. 1 represents a side view of a wheel assembly according to the present invention;

FIG. 2 represents the face view of the wheel assembly of FIG. 1;

DETAILED DESCRIPTION

Figure 3:
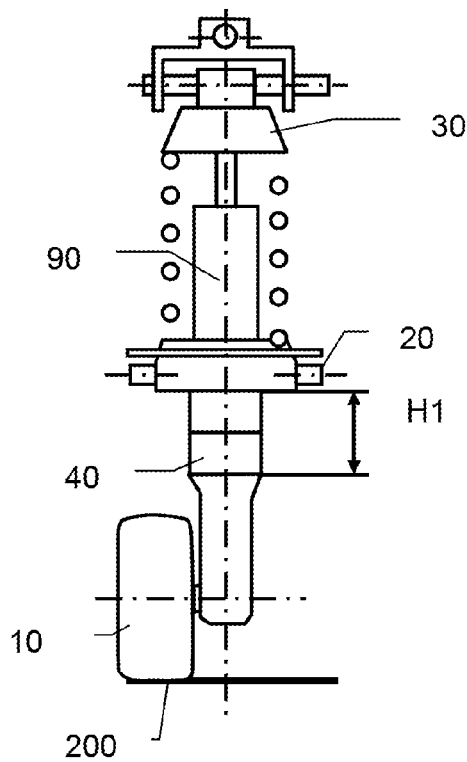
FIG. 3 represents the wheel assembly of FIG. 1 set at a first length.

The wheel assembly represented at Figure 1 comprises a wheel 10 that is arranged to rotate around a pivot line 90, in response to a command from an electric drive (not represented) engaged with a gear 96. The wheel assembly is arranged to be attached to a vehicle between the upper part 30 and the lower suspension arm 20. The upper part 30 is arranged to be moveable relatively to the vehicle and has two degrees of freedom. These two degrees of freedom are translations along the two perpendicular axes 31 and 32. The wheel assembly is equipped with caster angle adjustment means 35 which are arranged to control the position of the upper part 30 along the two perpendicular axes 31 and 32, with screw-nut assemblies in order to adjust precisely the caster angle $\alpha$ of the wheel assembly by moving the position of the upper attachment part 30 in two perpendicular directions. A first screw 31b is attached to a first moveable nut 31a, and a second screw 32b is attached to a second moveable nut 32a. The two plates 100 are part of the vehicle chassis, to give reference to the movements executed by the two screw-nut assemblies. The first screw 31b is attached to the plates 100 and thus is arranged to move the upper part 30 in its direction, as represented by the double arrow on upper part 30. The wheel assembly comprises suspension means 50 and also comprises length adjustment means 40, as will be detailed in the following paragraphs relative to FIGS. 3 & 4. The wheel 10 may be powered by one electric motor not shown, mounted at the top of the wheel assembly.

FIG. 2 shows a front view of the wheel assembly of FIG. 1. In this view at 90° from the FIG. 1, it is noticed that it is now the second screw 32b that is arranged to move the upper part 30 along its axis, as shown by the double arrow on upper part 30, as the second screw 32b is attached to the first moveable nut 31a powered by the first screw 31b. The two screws 31b and 32b may be powered either by electric motors or by pneumatic motors.

FIG. 3 shows a front view of the wheel assembly of FIG. 1. The length adjustment means 40 are set up at a low height H1, so that the distance between the ground 200 and the upper part 30 is low. This arrangement may correspond to standard driving conditions, when for example the vehicle is driving onto asphalt or regular rods.

Figure 4:
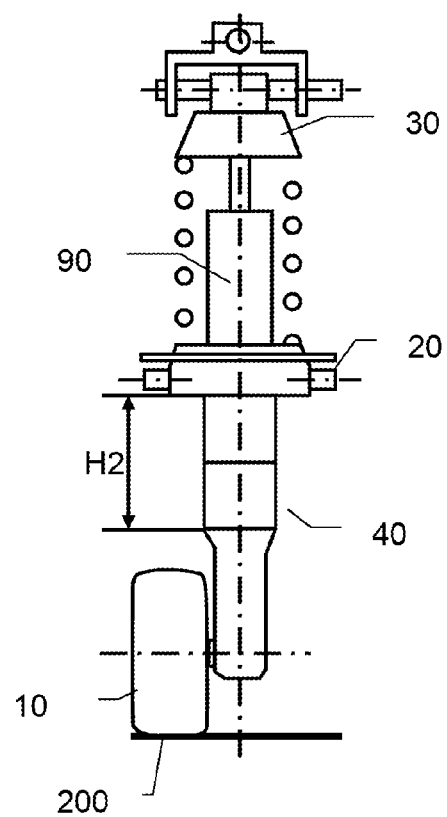
FIG. 4 represents the wheel assembly of FIG. 1 set at a second length.

FIG. 4 shows a front view of the wheel assembly of FIG. 1. The length adjustment means 40 are set up at a great height H2, so that the distance between the ground and the upper part 30 is important. This arrangement may correspond to specific driving conditions, when for example the vehicle is driving in off-road conditions, or when there are floods, so that the vehicle chassis is elevated enough not to touch the water. The occupants may then continue their trip. It may be necessary to elevate the vehicle up to one meter from ground, and the stability may be compromised, but the caster angle adjustment means may then position the upper part 30 so that the width between the wheels (in other words, the track) is increased to increase the stability of the vehicle, to avoid any roll over issues.

Figure 5:
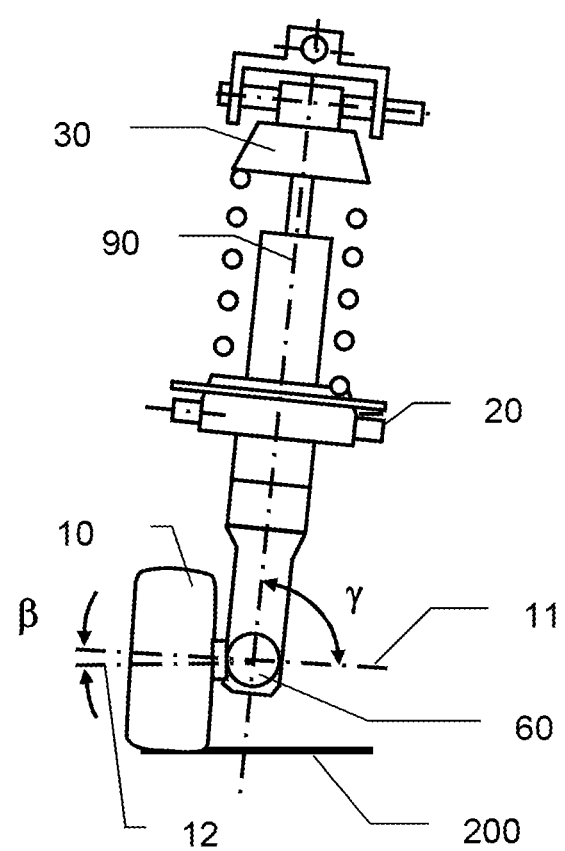
FIG. 5 represents a front view of another embodiment of the invention.

FIG. 5 represents a wheel assembly according to another embodiment of the invention. In this particular embodiment, an articulation 60 is integrated between the wheel axis 11 and the pivot line 90, so that the angle γ between those two axes is adjustable. It results that the camber angle β between the wheel axis 11 and a horizontal line 12 is adjustable to compensate an effect of the adjustment of the caster angle. Indeed, since the upper part 30 is moveable along two independent degrees of freedom, the pivot line 90 may be oriented so that the wheel 10 is moved out of the periphery of the vehicle chassis to improve the stability of the vehicle and the articulation 60 allows an adjustment of the camber angle, to avoid an excessive value of this camber angle.

It is understood that obvious improvements and/or modifications for one skilled in the art may be implemented, being under the scope of the invention as it is defined by the appended claims. In particular, the invention mentions the possibility to adjust the camber angle to avoid excessive stress on tires, but it may be contemplated to use motorbike tires, i.e. circular section tires, to have constant contact point between the ground and tire, ensuring continuous road grip at extreme angle inclination. It is also mentioned that the movements along the degrees of freedom are obtained by screws positioning nut along their axes, but it may also planed to render the screw moveable along its axis, by a rotation of the nut. In other words, it may be either the screw or the nut which is moveable along the screw axis.

The invention claimed is:

1. A wheel assembly for a vehicle comprising:
   a wheel, at least one lower suspension link being arranged to be attached to the vehicle and one upper part being arranged to be attached to the vehicle,
   the wheel being arranged to rotate at 360° to steer the vehicle around a pivot line positioned by said at least one lower suspension link and the upper part once attached to the vehicle,
   wherein a projection of the pivot line onto a vertical projection plane comprising a vertical axis passing through a contact point between the wheel and ground defining a caster angle with the vertical axis, the wheel assembly further including:
   a caster adjustment means arranged to adjust the caster angle within a predetermined range, whatever the orientation of the projection plane, wherein the position of the upper part is moveable relative to the vehicle along a first degree of freedom and a second degree of freedom and the caster adjustment means are arranged to control the position of the upper part along the first degree of freedom and the second degree of freedom, wherein the first degree of freedom and the second degree of freedom are two translations along two axes contained in a plane perpendicular to the pivot line.

2. A wheel assembly according to claim 1, wherein the caster adjustment means comprise a first and a second screw forming the two axes, the first screw being arranged to be attached to the vehicle and controlling a position along its axis of a first moveable nut, the second screw being attached to the first moveable nut and controlling a position along its axis of a second moveable nut, and an upper part of the second screw being attached to the second moveable nut.

3. A wheel assembly according to claim 2, wherein the caster adjustment means comprises two electrical motors with the first and second screws each linked to one of the electrical motors and arranged to control the position of the first and second moveable nuts.

4. A wheel assembly according to claim 2, wherein the caster adjustment means comprises two pneumatic motors with the first and second screws each linked to one of said pneumatic motors and arranged to control the position of the first and second moveable nuts.

5. A wheel assembly according to claim 1 being arranged to adjust the caster angle in relation to driving conditions.

6. A wheel assembly according to claim 1, further comprising a length adjustment means arranged to adjust a distance between the upper part and the contact point between the wheel and ground, in relation to the adjusted caster angle.

7. A wheel assembly according to claim 6, wherein the length adjustment means is arranged to adjust the distance in relation to the rotation of the wheel around the pivot line.

8. A wheel assembly according to claim 1, further comprising an articulation between the wheel axis and the pivot line, and a camber angle adjustment means arranged to allow an adjustment of the camber angle between a wheel axis and a horizontal axis to compensate for an effect of an adjustment of the position of the upper part along any of its degrees of freedom.

9. A wheel comprising at least one wheel assembly according to claim 1, wherein the caster angle is adjusted in relation to driving conditions.

* * * * *